(12) United States Patent
Farb

(10) Patent No.: US 9,297,356 B2
(45) Date of Patent: Mar. 29, 2016

(54) SHROUDED TURBINE BLADE DESIGN

(75) Inventor: Daniel Farb, Beit Shemesh (IL)

(73) Assignee: LEVIATHAN ENERGY LLC, Beth Shemesh (IL)

( * ) Notice: Subject to any disclaimer, the term of this patent is extended or adjusted under 35 U.S.C. 154(b) by 1245 days.

(21) Appl. No.: 12/867,759

(22) PCT Filed: Feb. 12, 2009

(86) PCT No.: PCT/IB2009/050579
§ 371 (c)(1),
(2), (4) Date: Aug. 16, 2010

(87) PCT Pub. No.: WO2009/101596
PCT Pub. Date: Aug. 20, 2009

(65) Prior Publication Data
US 2010/0329870 A1    Dec. 30, 2010

Related U.S. Application Data

(60) Provisional application No. 61/028,545, filed on Feb. 14, 2008, provisional application No. 61/058,235, filed on Jun. 3, 2008.

(51) Int. Cl.
  *F03D 1/04* (2006.01)
  *F03D 1/06* (2006.01)
  *F03B 3/12* (2006.01)

(52) U.S. Cl.
  CPC . *F03D 1/04* (2013.01); *F03B 3/121* (2013.01); *F03D 1/065* (2013.01); *F05B 2240/13* (2013.01); *F05B 2240/301* (2013.01); *F05B 2240/97* (2013.01); *F05B 2250/20* (2013.01); *F05B 2250/70* (2013.01); *F05B 2270/20* (2013.01); *Y02E 10/223* (2013.01); *Y02E 10/721* (2013.01)

(58) Field of Classification Search
  CPC ........... F03D 1/04; F03D 1/065; F03B 3/121; F05B 2250/70; F05B 2240/13; F05B 2240/301
  USPC ........................................................ 416/189
  See application file for complete search history.

(56) References Cited

U.S. PATENT DOCUMENTS

| | | | | |
|---|---|---|---|---|
| 3,339,078 | A * | 8/1967 | Crompton | 290/44 |
| 4,075,500 | A * | 2/1978 | Oman et al. | 290/55 |
| 4,291,235 | A * | 9/1981 | Bergey et al. | 290/55 |
| 5,399,070 | A * | 3/1995 | Alizaden | 416/189 |
| 6,241,474 | B1 * | 6/2001 | Alizadeh et al. | 416/189 |
| H2057 | H * | 1/2003 | Veers et al. | 416/230 |
| 6,579,063 | B2 * | 6/2003 | Stairs et al. | 416/169 A |
| 7,186,088 | B2 * | 3/2007 | Havel et al. | 416/189 |

(Continued)

FOREIGN PATENT DOCUMENTS

FR   2485106 A1 * 12/1981
WO   WO 2008010200 A2 * 1/2008

*Primary Examiner* — Igor Kershteyn
*Assistant Examiner* — Jesse Prager
(74) *Attorney, Agent, or Firm* — Mark M. Friedman

(57) ABSTRACT

The use of a shroud surrounding turbine blades to enhance the energy output creates a distribution of wind speeds in the plane of the blades. A unique class of such shrouds previously patented by the author creates zones of higher velocity near the tips. In order to take advantage of this new distribution of velocity, new principles of propeller design are required. One of the designs involves increasing the P/D ratio and the PHI in the outer portion of the blades. This solution works for liquids and gases.

8 Claims, 4 Drawing Sheets

(56) References Cited

U.S. PATENT DOCUMENTS

| | | | | |
|---|---|---|---|---|
| 7,256,512 | B1* | 8/2007 | Marquiss | 290/55 |
| 7,540,716 | B2* | 6/2009 | Wobben | 416/228 |
| 7,789,629 | B2* | 9/2010 | Corren | 416/223 R |
| 8,061,996 | B2* | 11/2011 | Herr et al. | 416/223 R |
| 2003/0185666 | A1* | 10/2003 | Ursua | 415/4.2 |
| 2009/0311099 | A1* | 12/2009 | Richards | 416/120 |
| 2010/0068058 | A1* | 3/2010 | Sorensen | 416/41 |
| 2010/0213721 | A1* | 8/2010 | Hayashi et al. | 290/55 |
| 2011/0052400 | A1* | 3/2011 | Khan | 416/223 R |
| 2011/0150664 | A1* | 6/2011 | Mickeler et al. | 416/241 R |
| 2012/0207610 | A1* | 8/2012 | Yu et al. | 416/223 R |

* cited by examiner

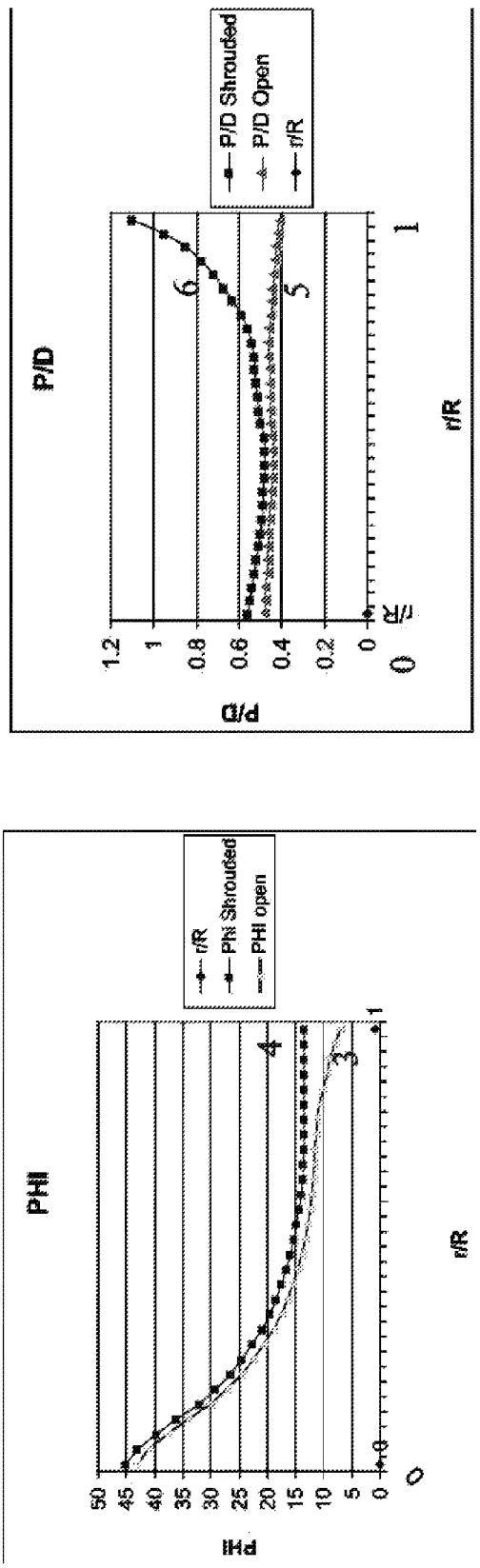
Figure 4 Pitch Distribution

SHROUDED TURBINE BLADE DESIGN

RELATED APPLICATIONS

This patent application is a National Stage of PCT/IB2009/050579 filed on Feb. 12, 2009, which claims the benefit of U.S. Provisional Patent Application No. 61/028,545, entitled Provisional 2-08: One-directional bearings, Large and Small Wind, Hydro, Blade Design, filed Feb. 14, 2008 and No. 61/058,235, Provisional 6-08: Improvements to renewable energy devices, filed Jun. 3, 2008, the contents of which are incorporated herein by reference.

SUMMARY OF THE INVENTION

The present invention successfully addresses the shortcomings of the presently known configurations by providing a set of criteria for improving the performance of blades in a shrouded turbine.

It is now disclosed for the first time a substantially 10-meter diameter blade for use with a shrouded turbine with a shroud of substantially 1-meter chord length, in any proportional value, comprising the maintenance of geometric similitude and the advance ratio ($J_S = V_S/nD$), with the following parameters (r being the radial coordinate, R the radius, with 1.000 being the tip of the blade, c the chord length, D the diameter, t the section thickness, f the section camber, $\phi$ the geometric pitch angle, P the pitch), with a deviation of 10% of the value for any point, for the values in any individual column or for any combination of any group of two or more columns in relation to the r/R value,

| r/R   | c/D     | t/c     | f/c      | φ (deg) | P/D     | c (m) | t (m) | f (m)   |
|-------|---------|---------|----------|---------|---------|-------|-------|---------|
| 0.150 | 0.10490 | 0.18000 | −0.03137 | 50.000  | 0.56160 | 1.049 | 0.189 | −0.033  |
| 0.200 | 0.10450 | 0.17412 | −0.04396 | 40.987  | 0.54593 | 1.045 | 0.182 | −0.046  |
| 0.300 | 0.10249 | 0.16235 | −0.05424 | 28.650  | 0.51493 | 1.025 | 0.166 | −0.056  |
| 0.400 | 0.09908 | 0.15059 | −0.05551 | 21.077  | 0.48431 | 0.991 | 0.149 | −0.055  |
| 0.500 | 0.09411 | 0.13882 | −0.05370 | 16.509  | 0.46555 | 0.941 | 0.131 | −0.051  |
| 0.600 | 0.08724 | 0.12706 | −0.05056 | 13.862  | 0.46514 | 0.872 | 0.111 | −0.044  |
| 0.700 | 0.07829 | 0.11529 | −0.04743 | 12.168  | 0.47418 | 0.783 | 0.090 | −0.037  |
| 0.800 | 0.06764 | 0.10353 | −0.04363 | 11.211  | 0.49814 | 0.676 | 0.070 | −0.030  |
| 0.900 | 0.05554 | 0.09176 | −0.03989 | 11.435  | 0.57193 | 0.555 | 0.051 | −0.022  |
| 0.925 | 0.05230 | 0.08882 | −0.03908 | 11.813  | 0.60780 | 0.523 | 0.046 | −0.020  |
| 0.950 | 0.04896 | 0.08588 | −0.03858 | 12.701  | 0.67266 | 0.490 | 0.042 | −0.019  |
| 0.975 | 0.04553 | 0.08294 | −0.03879 | 14.637  | 0.79998 | 0.455 | 0.038 | −0.018  |
| 1.000 | 0.04196 | 0.08000 | −0.04002 | 18.000  | 1.02077 | 0.420 | 0.034 | −0.017  |

According to another embodiment, the blade is for use in a liquid.

According to another embodiment, the blade is surrounded by a foil shape.

According to another embodiment, the shroud is a Farb foil.

According to another embodiment, the blade is part of a system of 3 blades.

According to another embodiment, the rpm is adjusted to 25-30 in a 3-meter per second flow in a liquid.

It is now disclosed for the first time a turbine comprising:
a. at least one shrouded blade, wherein the ratio of rpm to diameter at a 3-meter per second flow in a liquid is 2.2 to 3.2.

It is now disclosed for the first time a turbine, comprising:
a. an NACA series blade,
b. a shroud,
Such a type of blade is particularly effective.

According to another embodiment, the shroud comprises a C foil, with a margin of 10% for any single point.

According to another embodiment, the shroud comprises a Farb foil, with a margin of 10% for any single point.

According to another embodiment, the shroud is a partial foil.

According to another embodiment, the blade comprises an NACA 44 series foil.

It is now disclosed for the first time a shrouded blade, wherein the tip does not have the lowest Phi value.

According to another embodiment, the Phi value of the tip is at least 3 degrees higher than the section with the lowest Phi value.

According to another embodiment, the Phi value increases by at least 5 degrees between an r/R ratio of 0.8 to 1.0.

It is now disclosed for the first time a shrouded blade, wherein the P/D ratio at the tip is greater than 0.7.

According to another embodiment, the ratio is greater than 1.0.

It is now disclosed for the first time a shrouded blade, wherein the Phi value starts to increase at a point 60-90% of the length from the center to the periphery.

It is now disclosed for the first time a shrouded blade, wherein the P/D ratio starts to steadily increase starting from any point within 40-90% of the distance from the center to the periphery.

It is now disclosed for the first time a shrouded blade, with the following parameters, in any proportional value, with a deviation of 10% of the value for any point, for the values in any individual column or for any combination of any group of both columns in relation to the r/R value, proportional to any size blade: (Table 2)

| r/R     | c/R      | Phi      |
|---------|----------|----------|
| 0.13820 | 0.295890 | 44.95916 |
| 0.15596 | 0.286650 | 43.01705 |
| 0.18667 | 0.270180 | 39.76573 |
| 0.22496 | 0.250070 | 36.09830 |
| 0.26726 | 0.229480 | 32.10272 |
| 0.31156 | 0.210200 | 29.05061 |
| 0.35670 | 0.192960 | 26.41902 |
| 0.40198 | 0.177880 | 24.53083 |
| 0.44693 | 0.164780 | 22.56773 |
| 0.49122 | 0.153390 | 20.90665 |
| 0.53458 | 0.143480 | 19.51586 |
| 0.57680 | 0.134850 | 18.35955 |
| 0.61770 | 0.127330 | 17.38834 |
| 0.65711 | 0.120770 | 16.56282 |
| 0.69490 | 0.115050 | 15.84945 |
| 0.73092 | 0.110060 | 15.22573 |
| 0.76507 | 0.105690 | 14.70786 |
| 0.79723 | 0.101840 | 14.30656 |
| 0.82731 | 0.098452 | 14.00050 |
| 0.85520 | 0.095469 | 13.78477 |

-continued

| r/R | c/R | Phi |
|---|---|---|
| 0.88082 | 0.092852 | 13.64459 |
| 0.90411 | 0.090573 | 13.56008 |
| 0.92498 | 0.088608 | 13.51560 |
| 0.94338 | 0.086932 | 13.49927 |
| 0.95925 | 0.085530 | 13.49872 |
| 0.97254 | 0.084386 | 13.50525 |
| 0.98322 | 0.083488 | 13.51270 |
| 0.99126 | 0.082824 | 13.51756 |
| 0.99664 | 0.082387 | 13.52092 |
| 0.99933 | 0.082169 | 13.52319 |

It is now disclosed for the first time a method of improving the percentage of power obtained from a shrouded turbine performing at least one and preferably two of the following operations: changing the twist at the periphery and increasing the chord length at the periphery over what might have been done for an open blade.

FIELD AND BACKGROUND OF THE INVENTION

The present invention relates to blade designs for shrouded turbines and how they differ from regular blade designs.

A shrouded turbine, particularly with the use of airfoil shapes such as the C and Farb foils described in the author's PCT IL2007/000348. Flow Deflection Devices and Methods for Energy Capture Machines and patent 8188611, results in acceleration of velocity near the tips of the blades. This unique velocity profile requires a different blade design to take advantage of it. There the author presented the C and Farb foils and the advantages of partial foils and the need to construct a blade in such a way as to adapt it to the unique velocity patterns of a shroud were generally discussed. This patent application gives specific criteria for such a design.

BRIEF DESCRIPTION OF THE DRAWINGS

The invention is herein described, by way of example only, with reference to the accompanying drawings, wherein:

FIG. 4 is a diagram of pitch.

DESCRIPTION OF THE PREFERRED EMBODIMENTS

The present invention is a new set of blade designs for shrouded turbines.

Definitions: For convenience, here are some common abbreviations used in the claims and the science of blade design, whether for water or wind turbines.

c Chord length
$C_L$ Lift coefficient, $C_L = L/\frac{1}{2}\rho V_R^2 c$
$C_T$ Thrust coefficient, $C_T = T/\frac{1}{2}\rho V_S^2 \pi R^2$
$C_{Pwr}$ Power coefficient, $C_P = P_D/\frac{1}{2}\rho V_S^3 \pi R^2$
$C_p$ Pressure coefficient, $C_p = (p-p_x)/\frac{1}{2}\rho V_S^2$
D Diameter, D=2R
f Section camber
G Non-dimensional circulation, $G = \Gamma/2\pi R V_S$
h Section offset
$J_S$ Advance ratio, $J_S = V_S/nD$
$K_T$ Thrust coefficient, $K_T = T/\rho n^2 D^4$
$K_Q$ Torque coefficient, $K_Q = Q/\rho n^2 D^5$
n Rotational speed, rev/s
L Lift (per unit span)
P Pitch
$P_D$ Delivered power
$p_v$ Vapor pressure
$p_\infty$ Ambient pressure
r Radial coordinate or radius of the propeller
R Propeller tip radius
t Section thickness
T Thrust
Q Torque
$V_R$ Relative velocity
$V_S$ Free steam speed
$V_T$ Tangential velocity
$V_x$ Axial velocity
x, y, z Cartesian coordinate system (x+downstream, y+starboard, z+up)
$\phi$ Geometric pitch angle
$\Gamma$ Circulation
$\rho$ Fluid density
$\sigma$ Cavitation number, $\sigma = (p_\infty - p_v)/\frac{1}{2}\rho V_S^2$
RPM Revolutions per minute, RPM=60n It is known by those familiar with the art of aerodynamics:
Pitch (P) is a linear dimension while Phi is an angle. They are related by:

$$P = 2*pi*r*\tan(Phi) \text{ or } P/D = pi*(r/R)*\tan(Phi)$$

where
r=local radius
R=tip radius
D=diameter=2*R

Pitch (P) is the axial distance for one revolution of a cylindrical helix of radius r.

The principles and operation of a blade in a shrouded turbine according to the present invention may be better understood with reference to the drawings and the accompanying description.

Figure 1:
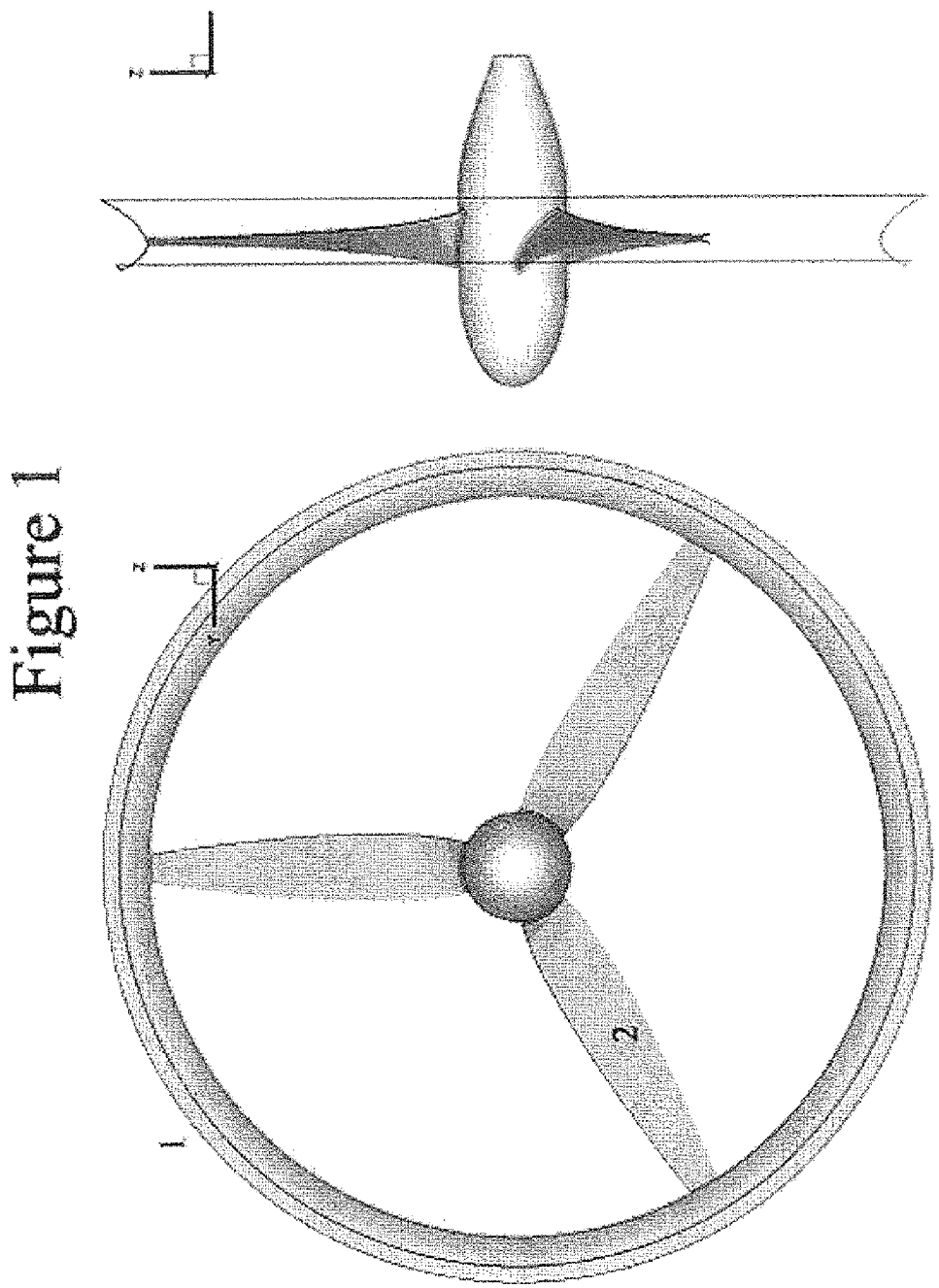
FIG. 1 is a diagram of an aft and side view of a blade.
Figure 2:
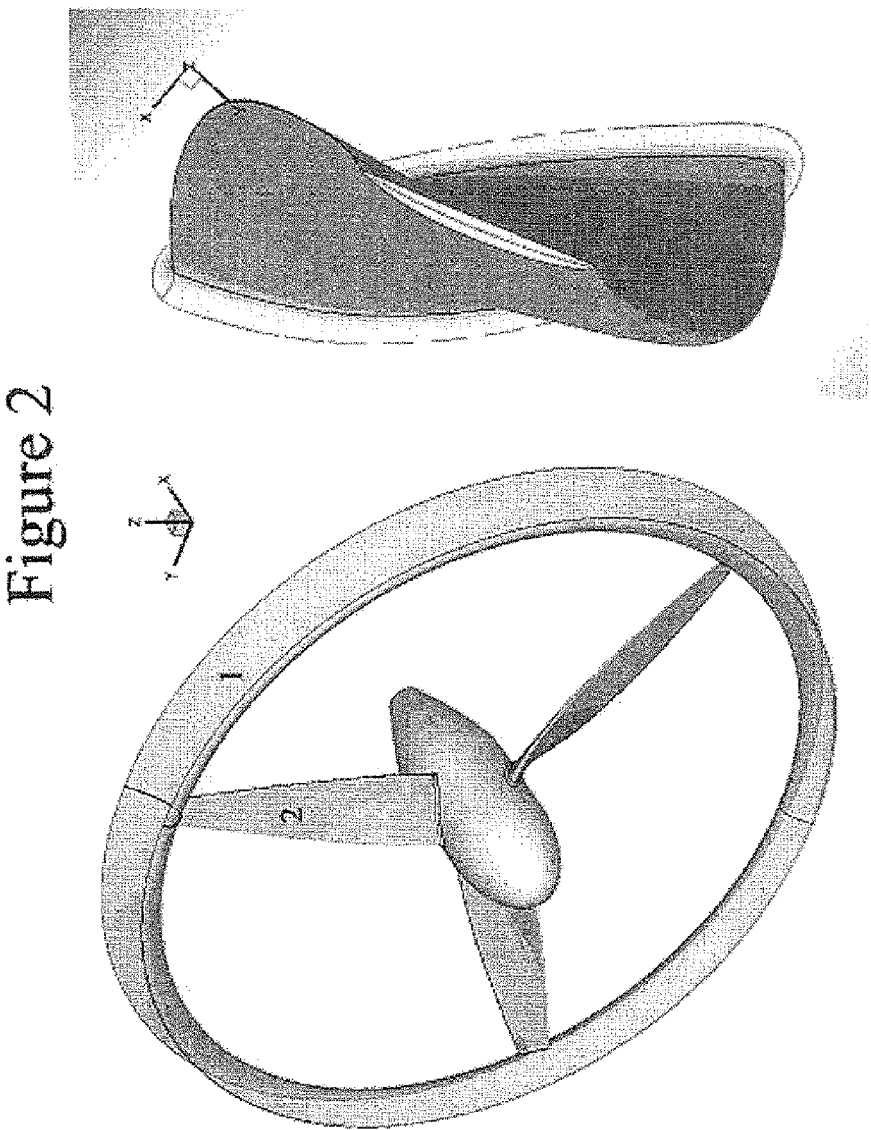
FIG. 2 is a diagram of a perspective view of a blade.

Referring now to the drawings, FIG. 1 illustrates an aft and side view of a shroud (1) and a blade (2) built according to the principles to be explained. The specific type of shroud shown here is a "Farb foil"—PCT IL2007/000348 and U.S. Pat. No. 8,188,611 B2, FIG. 2 is a perspective view of the same structures. This section of the patent application illustrates a 10-meter diameter blade system (Radius R of 5 meters) combined with a Farb foil of 1 meter chord length in water, but it can apply to many other configurations and fluids.

One can see a little how the pitch at the periphery increases.

Figure 3:
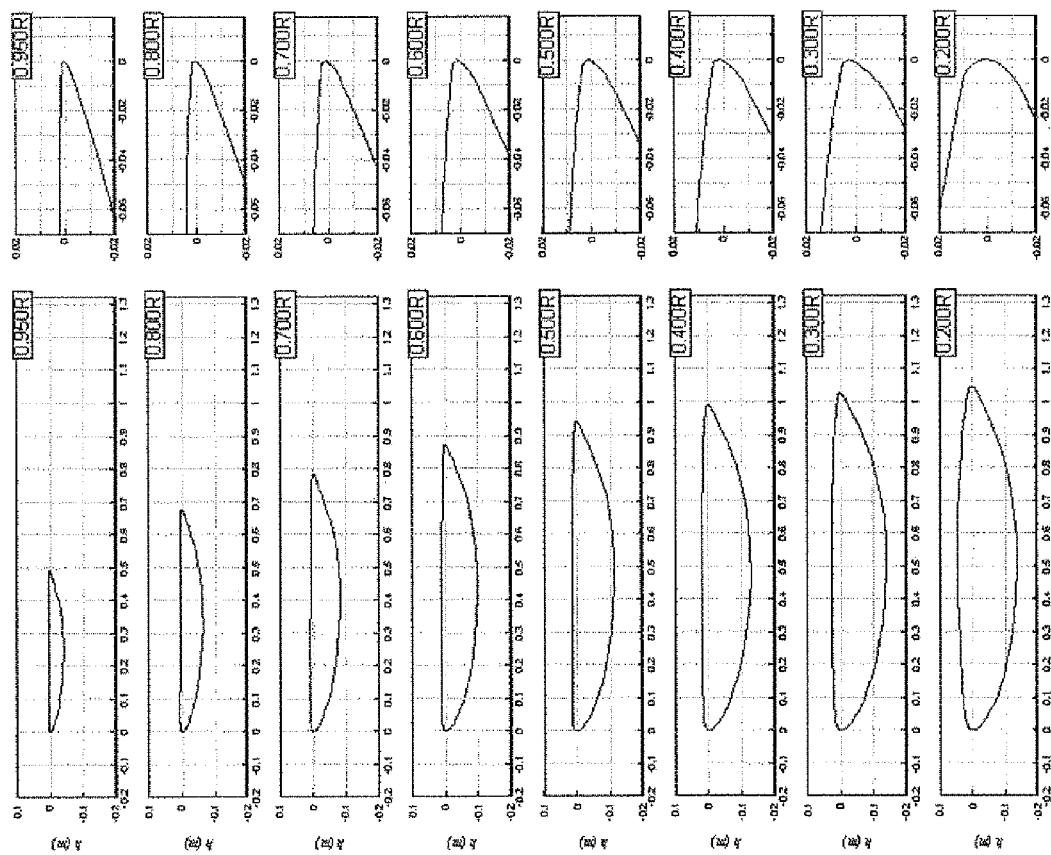
FIG. 3 is a diagram of blade cross-sections.

FIG. 3 is a diagram of blade cross-sections from the blade discussed.

As shown in FIG. 4, the pitch angle (Phi) (left vertical axis) of the shrouded rotor (4) relative to the open rotor (3) is about 2 degrees higher across much of the span and increases to about 13 degrees higher locally near the tip, The Phi of an open rotor (3) substantially decreases throughout. This difference is mainly due to the increased axial flow, particularly near the tip, that is induced by the shroud. At the same time, the P/D ratio is different for the shrouded (6) vs. open (5) rotor. Curve (4) reaches a minimum at approximately 82% of the distance to the periphery and then increases. In contrast, the Phi curve (3) of an open rotor always decreases. The P/D ratio of a shrouded rotor (6) in this case reaches a minimum at approximately 60% of the distance to the periphery, and increases to 1.1 at the tip. By contrast, an open rotor design (5) always has a lower P/D ratio at the tip than at the root.

Blades were sized to keep the maximum lift coefficient less than 0.8 in the design condition. The turbine operating at 27 rpm in a 3 ms (5.83 kt) stream was predicted to produce a shaft power of 648 kW (869 hp). This estimate does not include mechanical losses in the hub.

| r/R | c/D | t/c | f/c | φ (deg) | P/D | c (m) | t (m) | f (m) |
|---|---|---|---|---|---|---|---|---|
| 0.150 | 0.10490 | 0.18000 | −0.03137 | 50.000 | 0.56160 | 1.049 | 0.189 | −0.033 |
| 0.200 | 0.10450 | 0.17412 | −0.04396 | 40.987 | 0.54593 | 1.045 | 0.182 | −0.046 |
| 0.300 | 0.10249 | 0.16235 | −0.05424 | 28.650 | 0.51493 | 1.025 | 0.166 | −0.056 |
| 0.400 | 0.09908 | 0.15059 | −0.05551 | 21.077 | 0.48431 | 0.991 | 0.149 | −0.055 |
| 0.500 | 0.09411 | 0.13882 | −0.05370 | 16.509 | 0.46555 | 0.941 | 0.131 | −0.051 |
| 0.600 | 0.08724 | 0.12706 | −0.05056 | 13.862 | 0.46514 | 0.872 | 0.111 | −0.044 |
| 0.700 | 0.07829 | 0.11529 | −0.04743 | 12.168 | 0.47418 | 0.783 | 0.090 | −0.037 |
| 0.800 | 0.06764 | 0.10353 | −0.04363 | 11.211 | 0.49814 | 0.676 | 0.070 | −0.030 |
| 0.900 | 0.05554 | 0.09176 | −0.03989 | 11.435 | 0.57193 | 0.555 | 0.051 | −0.022 |
| 0.925 | 0.05230 | 0.08882 | −0.03908 | 11.813 | 0.60780 | 0.523 | 0.046 | −0.020 |
| 0.950 | 0.04896 | 0.08588 | −0.03858 | 12.701 | 0.67266 | 0.490 | 0.042 | −0.019 |
| 0.975 | 0.04553 | 0.08294 | −0.03879 | 14.637 | 0.79998 | 0.455 | 0.038 | −0.018 |
| 1.000 | 0.04196 | 0.08000 | −0.04002 | 18.000 | 1.02077 | 0.420 | 0.034 | −0.017 |

The following is a design for a smaller wind turbine surrounded by a partial foil. It shows the same principle of the Phi value increasing at the periphery. (Table 2)

| r/R | c/R | Phi |
|---|---|---|
| 0.13820 | 0.295890 | 44.95916 |
| 0.15596 | 0.286650 | 43.01705 |
| 0.18667 | 0.270180 | 39.76573 |
| 0.22496 | 0.250070 | 36.09830 |
| 0.26726 | 0.229480 | 32.10272 |
| 0.31156 | 0.210200 | 29.05061 |
| 0.35670 | 0.192960 | 26.41902 |
| 0.40198 | 0.177880 | 24.53083 |
| 0.44693 | 0.164780 | 22.56773 |
| 0.49122 | 0.153390 | 20.90665 |
| 0.53458 | 0.143480 | 19.51586 |
| 0.57680 | 0.134850 | 18.35955 |
| 0.61770 | 0.127330 | 17.38834 |
| 0.65711 | 0.120770 | 16.56282 |
| 0.69490 | 0.115050 | 15.84945 |
| 0.73092 | 0.110060 | 15.22573 |
| 0.76507 | 0.105690 | 14.70786 |
| 0.79723 | 0.101840 | 14.30656 |
| 0.82731 | 0.098452 | 14.00050 |
| 0.85520 | 0.095469 | 13.78477 |
| 0.88082 | 0.092852 | 13.64459 |
| 0.90411 | 0.090573 | 13.56008 |
| 0.92498 | 0.088608 | 13.51560 |
| 0.94338 | 0.086932 | 13.49927 |
| 0.95925 | 0.085530 | 13.49872 |
| 0.97254 | 0.084386 | 13.50525 |
| 0.98322 | 0.083488 | 13.51270 |
| 0.99126 | 0.082824 | 13.51756 |
| 0.99664 | 0.082387 | 13.52092 |
| 0.99933 | 0.082169 | 13.52319 |

The method of improving the percentage of power obtained from a shrouded turbine involves performing at least one and preferably two of the following operations to create a better match: changing the twist at the periphery and increasing the chord length at the periphery over what might have been done for an open blade. Designing the blades with characteristics obtained from the approximate midpoint of the normalized velocity curve enables one to take ideal advantage of the increased velocity without the risk of stalling.

While the invention has been described with respect to a limited number of embodiments, it will be appreciated that many variations, modifications and other applications of the invention may be made.

What is claimed is:

1. A shrouded turbine blade, said shroud characterized by a zone of higher velocity flow in the area of the tip of the blade it surrounds and said shroud having a curved shape with its narrowest part of the convex side of the curve adjacent to the blade, comprising a section thickness and a chord length, comprising a space separation between the blade tip and the shroud, wherein a P/D ratio, defined by pitch (P) divided by diameter (D), starts to increase consistently from any starting point within 40-90% of the distance from the center to the periphery of the blade and maintains that increase to the periphery, wherein the P/D ratio of the blade central to the starting point is not consistent increasing, and a t/c ratio, defined as section thickness (t) divided by chord length (c), and thickness decrease from center to periphery of the blade, wherein a pitch angle increases near the tip of the blade.

2. The blade of claim 1, wherein the P/D ratio at the tip is greater than 0.7.

3. The blade of claim 2, wherein the ratio is greater than 1.0.

4. A shrouded turbine blade, said shroud characterized by a zone of higher velocity flow in the area of the tip of the blade it surrounds and said shroud having a curved shaped with its narrowest part of the curve adjacent to the blade, the shrouded turbine blade comprising a profile in accordance with the parameters set forth in Table 2, in any proportional value, with a deviation of 10% of the c/R and Phi values set forth in Table 2 for any r/R point, wherein r is a radial coordinate, R is the radius, and Phi is pitch.

5. A shrouded turbine blade, said shroud characterized by a zone of higher velocity flow in the area of the tip of the blade it surrounds and said shroud having a curved shape with its narrowest part of the convex side of the curve adjacent to the blade, the blade is a substantially 10-meter diameter blade with said shroud of substantially 1-meter chord length, in any proportional value having the maintenance of geometric similitude, the shrouded turbine blade comprising a profile in accordance with the parameters set forth in the columns of Table 1, defined as r being the radial coordinate, R the radius, c the chord length, D the diameter, t the section thickness, f the section camber, φ the geometric pitch angle, and P the pitch with a deviation of 10% of the value for any r/R point set forth in Table 1.

6. The blade of claim 5 with a center to which the blade is attached and revolves, wherein, in a liquid speed of 3 meters per second, a setting of revolutions per minute of the blades is at 25-30.

7. The blade of claim 5, wherein a ratio of revolutions per minute to diameter at a 3-meter per second flow in a liquid is 2.2 to 3.2.

8. A shrouded turbine blade, said shroud characterized by a zone of higher velocity flow in the area of the tip of the blade it surrounds and said shroud having a curved shape with its narrowest part of the curve adjacent to the blade, comprising a section thickness and a chord length, comprising a space separation between the blade tip and the shroud, wherein the tip does not have a lowest Phi, defined as pitch angle, value in the length of the blade and a t/c ratio, defined as section thickness (t) divided by chord length (c), and thickness decrease from center to periphery of the blade, wherein the Phi value starts to increase at a point 60-90% of the length from the blade central to the periphery of the blade and does not consistently increase from center to the point.

* * * * *